United States Patent
Yang et al.

(10) Patent No.: US 12,420,404 B1
(45) Date of Patent: Sep. 23, 2025

(54) BIRFIELD FLEXIBLE VARIABLE-STIFFNESS CONTINUUM ROBOT UNIT AND CONTINUUM ROBOT

(71) Applicant: XI'AN JIAOTONG UNIVERSITY, Shaanxi (CN)

(72) Inventors: Laihao Yang, Shaanxi (CN); Yinchong Peng, Shaanxi (CN); Yu Sun, Shaanxi (CN); Xuefeng Chen, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 18/899,000

(22) Filed: Sep. 27, 2024

(30) Foreign Application Priority Data

Mar. 25, 2024 (CN) .......................... 202410342530.8

(51) Int. Cl.
| | |
|---|---|
| *B25J 9/06* | (2006.01) |
| *B25J 9/00* | (2006.01) |
| *B25J 9/10* | (2006.01) |
| *B25J 15/00* | (2006.01) |
| *B25J 19/02* | (2006.01) |

(52) U.S. Cl.
CPC ............ *B25J 9/065* (2013.01); *B25J 9/0015* (2013.01); *B25J 9/108* (2013.01); *B25J 15/0019* (2013.01); *B25J 19/023* (2013.01)

(58) Field of Classification Search
CPC . B25J 9/065; B25J 9/0015; B25J 9/108; B25J 19/023; B25J 15/0019
USPC .................................................... 74/490.04
See application file for complete search history.

(56) References Cited

U.S. PATENT DOCUMENTS

2010/0234988 A1* 9/2010 Buckingham ............ B25J 18/06
74/490.04

FOREIGN PATENT DOCUMENTS

| CN | 107053155 A | * | 8/2017 | ............... B25J 9/065 |
| CN | 112276920 A | * | 1/2021 | ............ B25J 13/087 |
| CN | 114367960 A | * | 4/2022 | ................. B25J 9/00 |
| CN | 114851180 A | * | 8/2022 | .......... B05B 13/0431 |

* cited by examiner

*Primary Examiner* — T. Scott Fix

(57) ABSTRACT

Disclosed is a birfield flexible variable-stiffness continuum robot unit and a continuum robot. In the birfield flexible variable-stiffness continuum robot unit, main structural units are interconnected to constitute a continuum manipulator; joint connecting structures connect the two adjacent main structural units; a front-end unit is arranged at a foremost end of the manipulator; and a rear-end unit is arranged at a rearmost end of the manipulator. When in use, birfield joint design is adopted, a single joint has two degrees of freedom, is more flexible and variable, and the adjacent structural units rotate around a center of a sphere, so that modeling is simpler and more convenient; connection design of flexible springs is further adopted, certain stiffness is provided for the manipulator, and thus the manipulator has a variable-stiffness characteristic; and meanwhile, a roll ball structure makes the manipulator have high torsional resistance.

14 Claims, 9 Drawing Sheets

BIRFIELD FLEXIBLE VARIABLE-STIFFNESS CONTINUUM ROBOT UNIT AND CONTINUUM ROBOT

CROSS-REFERENCE TO RELATED APPLICATION

This application claims priority from the Chinese patent application 2024103425308 filed Mar. 25, 2024, the content of which is incorporated herein in the entirety by reference.

TECHNICAL FIELD

The present disclosure relates to the technical field of continuum robots, in particular to a birfield flexible variable-stiffness continuum robot unit and a continuum robot.

BACKGROUND

A continuum robot is a kind of emerging robotics, and has its design inspired by soft tissues structures inside living organisms, such as elephant trunks and snakes. Compared with a traditional stiff robot, the continuum robot has high flexibility and deformability, and can imitate movement and adaptability of the living organisms, thereby having unique advantages and application potential in many fields such as search, spaceflight and medical treatment.

A structural unit of a continuum manipulator is a key part of the entire continuum robot, and its performance will directly affect the application of the robot. At present, structural design of the continuum manipulator further has some shortages and challenges. A traditional double-core column robot, for example, a structure used in an invention patent "Line Drive Continuum Robot" (publication number CN 111168658 A), is relatively complicated in motion modeling due to the fact that a curved shape is a complicated spline, and is poor in torsional resistance; and some contact-assisted structures limiting curved shapes of joints further exist, for example, an invention patent "Cam-assisted Flexible Continuum Robot Unit and Robot" (publication number CN 113814966 A), has a cam mechanism arranged in the middle, an invention patent "Gear-tooth-based Rolling Unit and Snakelike Arm Structure having same" (publication number CN 114654455 A), being connected in a rolling mode through gear tooth mesh, however, each joint of these structures only has one degree of freedom, and these structures are alternately arranged across each other by 90°, which still increases the difficulty for modeling.

The above information disclosed in the background technology is merely used to enhance the understanding of the background of the invention, and may therefore contain information that does not constitute the prior art known to those ordinarily skilled in the art.

SUMMARY

In order to solve the above problem, the present disclosure provides a birfield flexible variable-stiffness continuum robot unit and a continuum robot, birfield joint design is adopted, a single joint has two degrees of freedom, and is more flexible and variable, and adjacent structural units rotate around a center of a sphere, so that modeling is simpler and more convenient; connection design of flexible springs is further adopted, certain stiffness is provided for a manipulator, and thus the manipulator has a variable-stiffness characteristic; and meanwhile, a roll ball structure makes the manipulator have high torsional resistance, be capable of bearing a large torsional load, and can better adapt to perform tasks in different environments.

Objectives of the present disclosure are implemented through the following technical solutions. The birfield flexible variable-stiffness continuum robot unit includes:

a plurality of main structural units, interconnected in series to a manipulator, and each including:
a spherical shell structure, including:
an annular bearing surface, having a center through hole,
three outer raceways, equidistantly distributed on an outermost ring of the annular bearing surface and extending upwards from the annular bearing surface, spherical raceways of the three outer raceways all facing towards a central axis of the annular bearing surface,
a plurality of spring limiting columns, distributed on the annular bearing surface between the adjacent outer raceways in a penetrating mode,
a plurality of drive line through holes, distributed on the annular bearing surface between the adjacent spring limiting columns in a penetrating mode, and
a connecting barrel, extending downwards from the center through hole of the annular bearing surface, a connecting keyway being arranged on a side wall of the connecting barrel and extending in a direction parallel to the central axis; and
an inner race structure, including:
three inner raceways, equidistantly distributed on an outer side wall of the inner race structure, the inner raceways matching with the outer raceways of the adjacent main structural units to accommodate roll balls together, and
a connecting key, arranged on an inner side wall of the inner race structure and aligning at an inner wall of the center through hole, the connecting key being in key joint with the connecting keyway to connect the inner race structure with the spherical shell structure;
a plurality of joint connecting structures, connecting the two adjacent main structural units, and each including:
a triangular retainer, arranged between the spherical shell structure of one main structural unit and the inner race structure of the previous main structural unit,
three roll balls, nested in holes in three angles of the triangle retainer respectively, the roll balls being assembled in a raceway formed by the outer raceway of the spherical shell structure of one main structural unit and the inner raceway of the inner race structure of the previous main structural unit, and
a plurality of flexible springs, with two ends being connected to the spring limiting columns of the two adjacent spherical shell structures;
a front-end unit, arranged at a foremost end of the manipulator, and including:
a unit body, including a central threaded hole penetrating along the central axis,
a plurality of side channels, recessed inwards from a side surface of the unit body in a direction perpendicular to the central axis,
a plurality of drive line through holes, formed in bottom surfaces of the side channels,
a plurality of spring limiting columns, distributed at a bottom of the unit body, and
a connecting barrel, extending downwards from the central threaded hole of the front-end unit, a connecting keyway being arranged on a side wall of the connecting barrel and extends in a direction parallel to the central axis, and the connecting keyway being in key joint with connecting keys of the adjacent main structural units; and a rear-end unit, arranged at a rearmost end of the manipulator, and including:
an annular bearing surface, having a center through hole,
three outer raceways, equidistantly distributed on an outermost ring of the annular bearing surface and extending upwards from the annular bearing surface, spherical raceways of the three outer raceways all facing towards a central axis of the annular bearing surface,
a plurality of spring limiting columns, distributed on the annular bearing surface between the adjacent outer raceways in a penetrating mode,
a plurality of drive line through holes, distributed on the annular bearing surface between the adjacent spring limiting columns in a penetrating mode, and
a connecting chassis, arranged at a bottom of the annular bearing surface of the rear-end unit, a plurality of mounting fixing holes being distributed on a periphery of the connecting chassis.

In the birfield flexible variable-stiffness continuum robot unit, the unit body is of a hollow cylinder structure.

In the birfield flexible variable-stiffness continuum robot unit, the front-end unit is in threaded connection with operating apparatuses via the central threaded hole.

In the birfield flexible variable-stiffness continuum robot unit, the operating apparatuses include a camera, a searchlight, a sander or a scalpel.

In the birfield flexible variable-stiffness continuum robot unit, the rear-end unit is fixedly connected to a driving system via the mounting fixing holes.

In the birfield flexible variable-stiffness continuum robot unit, outer surfaces of angles in three directions of the triangular retainer are spherical surfaces.

In the birfield flexible variable-stiffness continuum robot unit, the spherical shell structure is nested outside the triangular retainer in a clearance fit mode, the inner race structure is nested inside the triangular retainer in a clearance fit mode, and the spherical shell structure, the triangular retainer and the inner race structure form a spherical pair connection.

In the birfield flexible variable-stiffness continuum robot unit, a pore diameter of the center through hole is the same as a pore diameter of the central threaded hole.

In the birfield flexible variable-stiffness continuum robot unit, the front-end unit, the main structural units and the rear-end unit are connected in series on the same curved central axis.

A continuum robot includes the birfield flexible variable-stiffness continuum robot unit, wherein, a plurality of drive lines sequentially penetrate through a front-end unit and main structural units to be connected with drive line through holes of the rear-end unit to form the continuum robot.

Compared with the prior art, the present disclosure has the advantages that:

1. The present disclosure adopts a birfield structure, spherical surfaces of the spherical shell structure, the triangular retainer and the inner race structure are nested one another to form the spherical pair connection, each joint has two degrees of freedom, and a universal single joint is achieved, such that the manipulator is more flexible and variable.

2. At the same time, the present disclosure further has a certain motion trail, since the joints are in the spherical pair connection, the adjacent structural units rotate around the center of the sphere, and thus modeling is more precise, simpler and more convenient.

3. At the same time, the present disclosure further has high torsional resistance, three roll balls are placed in the inner and outer raceways, when the two adjacent structural units are about to twist, the roll balls and the inner and outer raceways generate a contact twisting force to limit torsion skewing of the inner and outer raceways, such that the torsional resistance of the entire structure is greatly improved, and a larger torsional load can be borne.

4. At the same time, the present disclosure is further provided with flexible joints, springs are arranged on both sides of the outer raceways of each joint, and when the joints are not curved, the springs are already in a stretching state; and when the joints are curved, the stretching amount of the springs in a curving direction is reduced, the tensile force is reduced, otherwise, the tensile force is increased, such that certain stiffness is provided for the entire manipulator, some negative effects of an action of gravity are counteracted, more importantly, the manipulator can have the variable-stiffness characteristic, as curved angles of the joints are different, the joint stiffness is also different, the problem that an angle difference of each joint in the same segment is large due to underactuation is avoided, and the control precision is improved.

5. At the same time, the present disclosure is further provided with through holes in the middle of the entire structure to arrange the operating apparatuses, such as a cable, the camera, the searchlight, the sander, and the scalpel, so as to better adapt different environments for operation.

The above description is only an overview of the technical solutions of the present disclosure, in order to make technical means of the present disclosure clearer and more understanding to achieve the degree of implementing by those skilled in the art according to contents of the specification, and in order to make the above and other objectives, features and advantages of the present disclosure more obvious and understandable, illustrations are made below by taking specific implementations of the present disclosure as an example.

BRIEF DESCRIPTION OF DRAWINGS

By reading the detailed descriptions in the following preferred specific implementations, other various advantages and benefits of the present disclosure are getting clear for those ordinarily skilled in the art. Description accompanying drawings are merely used to illustrate preferred implementations, and are not considered to limit the present disclosure. Obviously, the accompanying drawings described below are only some embodiments of the present disclosure, and those ordinarily skilled in the art may further obtain other accompanying drawings according to these accompanying drawings without creative work. In addition, in the entire accompanying drawing, the same accompanying drawing reference numerals represents the same component.

In the accompanying drawings.

Figure 1:
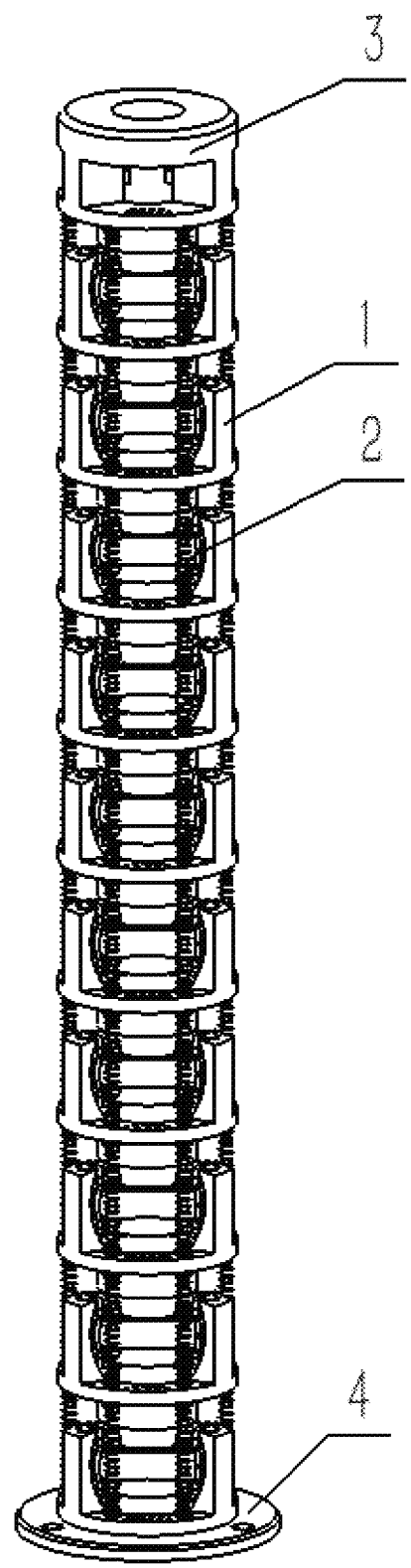
FIG. 1 is a schematic diagram of a birfield flexible variable-stiffness continuum robot unit and a continuum robot of the present disclosure.

The present disclosure is further explained below in conjunction with the accompanying drawings and embodiments.

DETAILED DESCRIPTION OF THE INVENTION

Specific embodiments of the present disclosure are described in more detail below with reference to accompanying drawings. Although the specific embodiments of the present disclosure are displayed in the accompanying drawings, it should be understood that the present disclosure may be implemented in various forms and does not be limited by the embodiments stated here. On the contrary, these embodiments are provided to make the present disclosure be understood more thoroughly, and to completely convey the scope of the present disclosure to the skilled in the art.

It needs to be noted that some words are used in the specification and claims to refer to specific components. The skilled in the art should understand that the skilled may use different nouns to call the same component. The specification and claims do not use the difference of nouns as a way of distinguishing components, but use differences of the components on functions as a criterion for distinguishing. For example, "contain" or "include" mentioned in the entire specification and claims is an open phrase, and thus should be explained as "contain but not limited to". The subsequent description of the specification is a preferred implementation for implementing the present disclosure, however, the description is for an objective of general principles of the specification, and is not used to limit the scope of the present disclosure. The scope of protection of the present disclosure should be as defined in the attached claims.

For facilitating understanding the embodiments of the present disclosure, further explanation is made below in conjunction with the accompanying drawings and taking the specific embodiments as an example, and each accompanying drawing does not constitute the limitation to the embodiments of the present disclosure.

For better understanding, as shown in FIG. 1 to FIG. 9, a birfield flexible variable-stiffness continuum robot unit includes main structural units 1, joint connecting structures 2, a front-end unit 3 and a rear-end unit 4; and the plurality of main structural units 1 are interconnected, the front-end unit 3 is arranged at a foremost end, the rear-end unit is arranged at a rearmost end, operating apparatuses are arranged at a central threaded hole 31 of the front-end unit 3, and a plurality of drive lines sequentially penetrate through drive line through holes 114, so as to constitute the birfield flexible variable-stiffness continuum robot unit and a robot.

Figure 2:
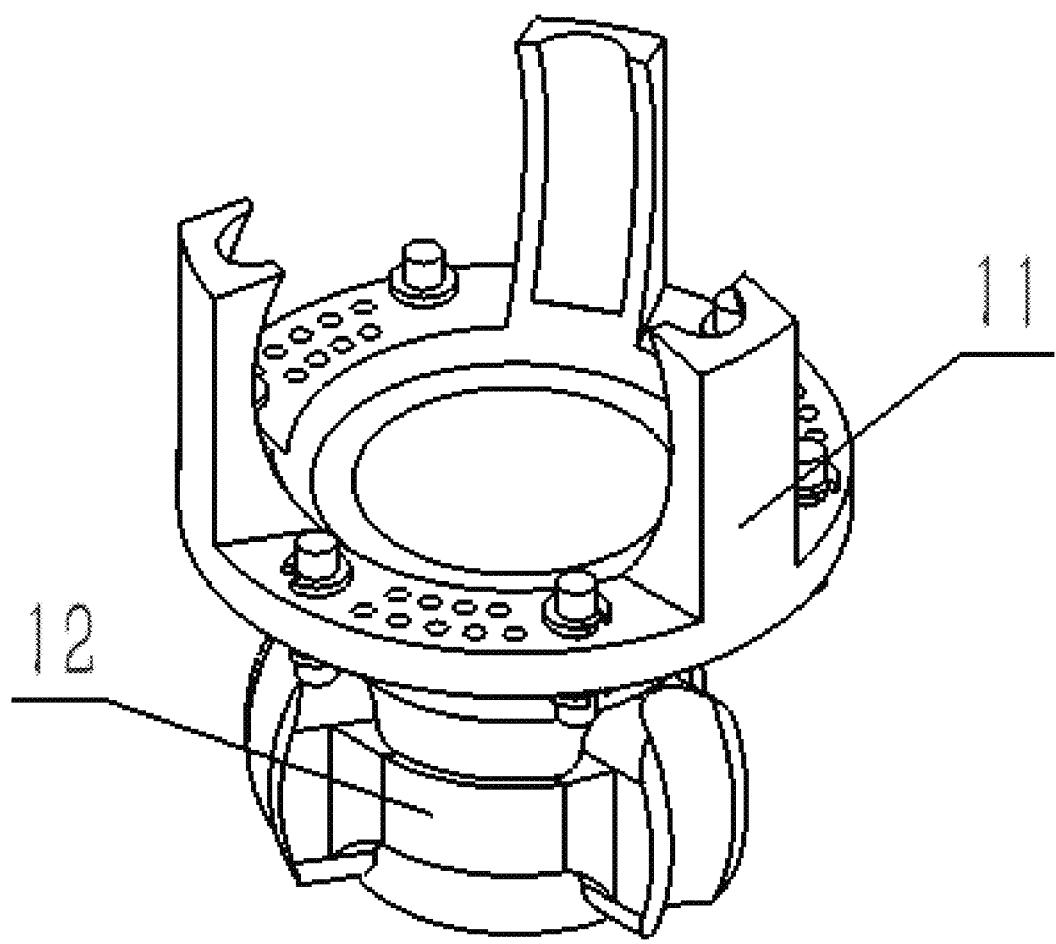
FIG. 2 is a schematic structural diagram of a main structural unit in the present disclosure.

As shown in FIG. 2, each main structural unit 1 includes a spherical shell structure 11 and an inner race structure 12; and a connection mode of the spherical shell structure 11 and the inner race structure 12 is a key connection.

Figure 3:
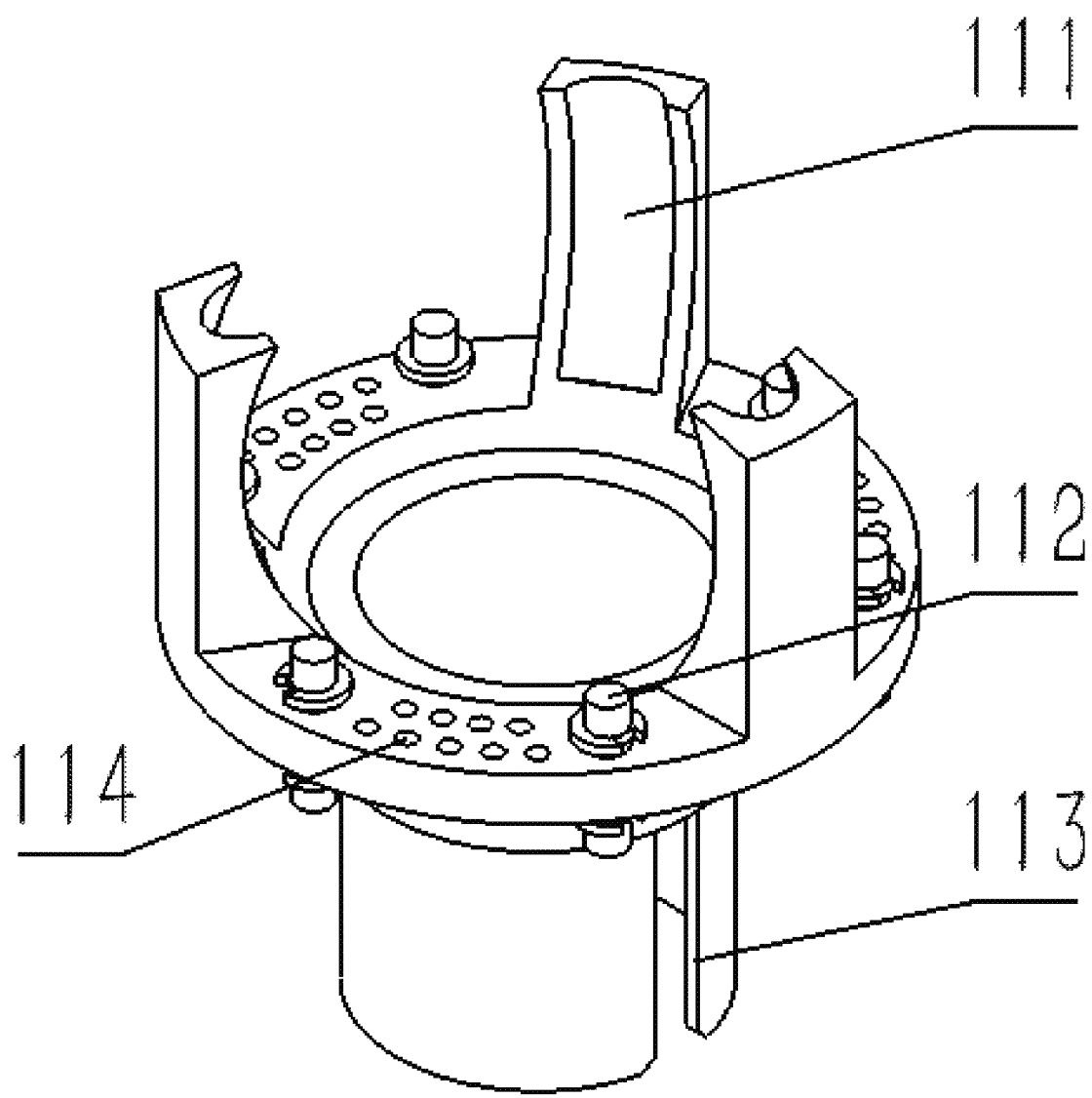
FIG. 3 is a schematic structural diagram of a spherical shell structure in the present disclosure.

As shown in FIG. 3, each spherical shell structure 11 includes outer raceways 111, spring limiting columns 112, a connecting keyway 113, and drive line through holes 114; the outer raceways 111 are semispherical raceways, three outer raceways are provided in total, respectively arranged at an outermost ring of the spherical shell structure 11 at an angle of 120°, and match with inner raceways 121 to accommodate roll balls 23 together; the spring limiting columns 112 are arranged next to the outer raceways 111, and six spring limiting columns are arranged in total for fixing flexible springs 22; the connecting keyway 113 is arranged on a side wall of the center through hole for being connected with the inner race structure 12; and the drive line through holes 114 are formed between the spring limiting columns 112 for being penetrated by the drive lines.

Figure 4:
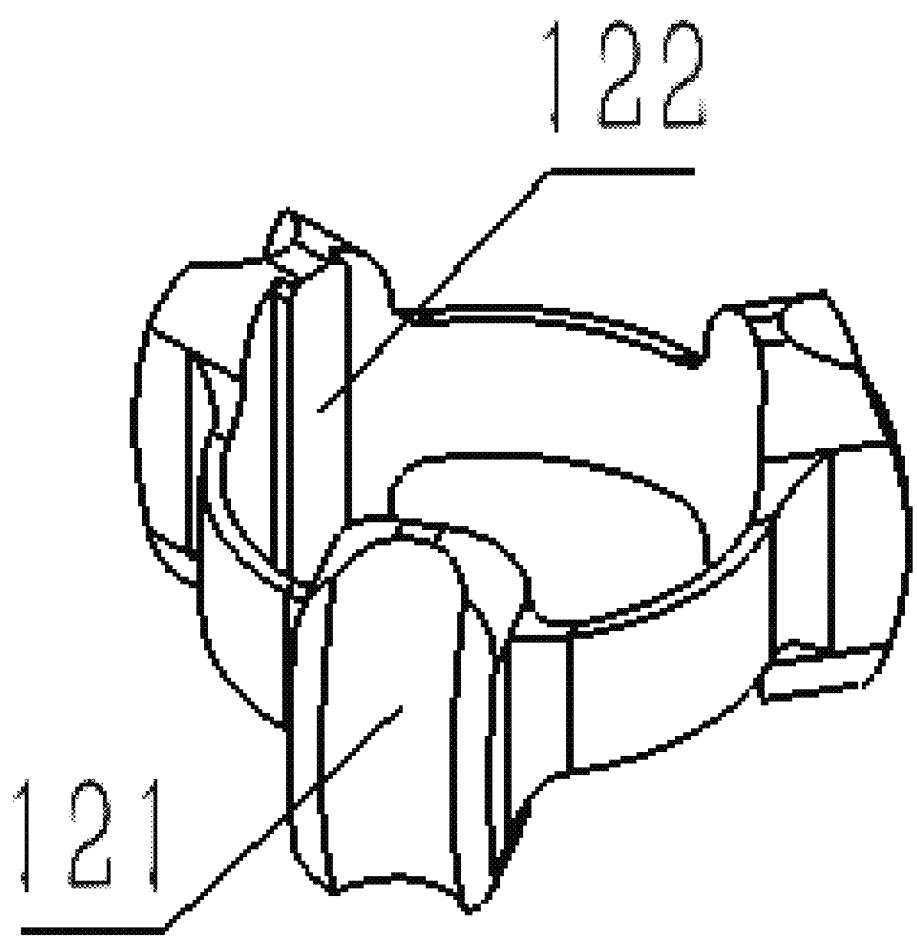
FIG. 4 is a schematic structural diagram of an inner race structure in the present disclosure.

As shown in FIG. 4, each inner race structure 12 includes an inner raceway 121 and a connecting key 122; the inner raceways 121 are semispherical raceways, three inner raceways are provided in total, respectively arranged on a side wall of the inner race structure 12 at an angle of 120°, and match with the outer raceways 111 to accommodate the roll balls 23 together; and the connecting key 122 are arranged on an inner wall of the center through hole for being connected with the spherical shell structure 11.

Figure 5:
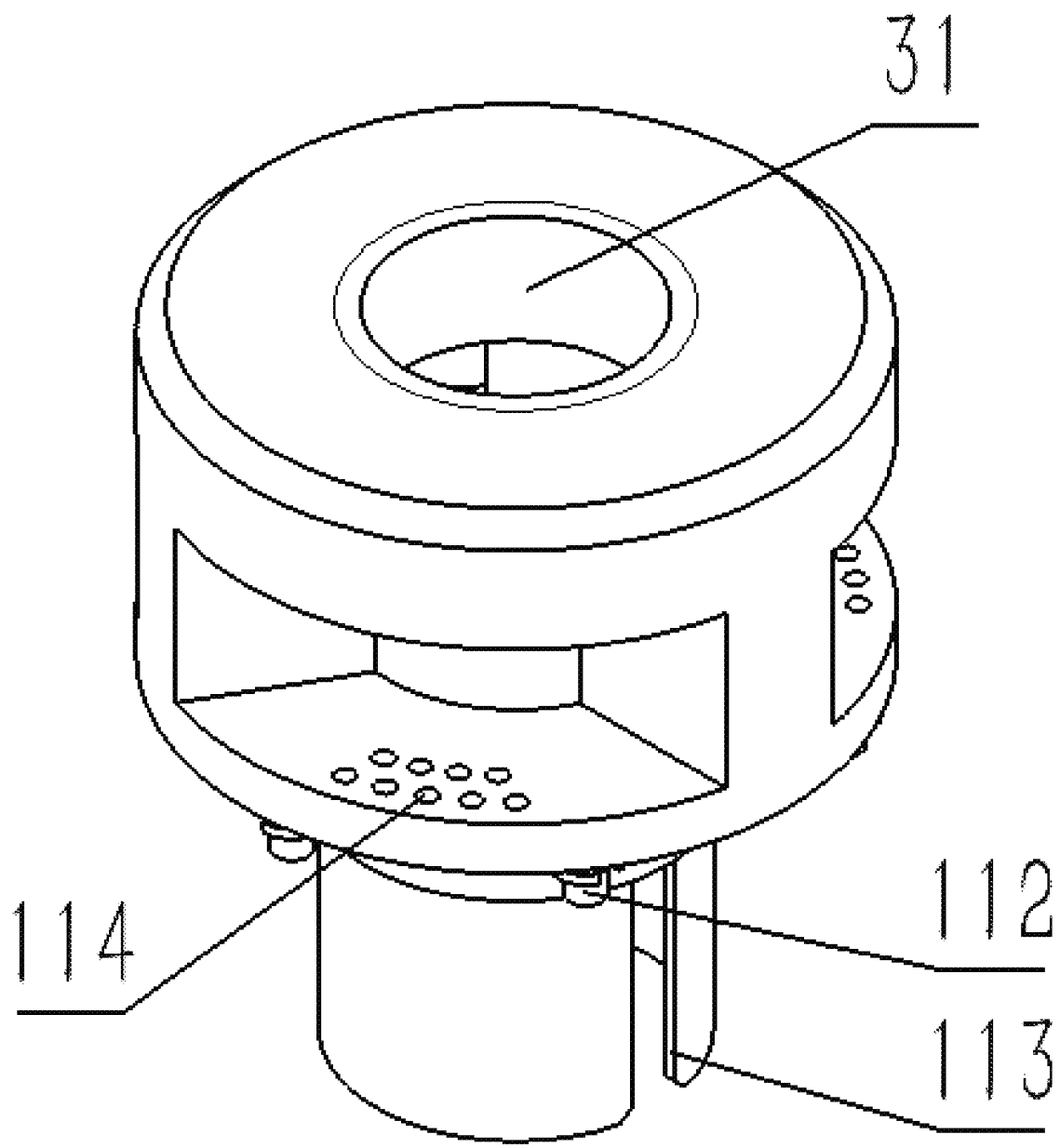
FIG. 5 is a schematic structural diagram of a front-end unit in the present disclosure.

As shown in FIG. 5, the front-end unit 3 includes a central threaded hole 31, spring limiting columns 112, connecting keyways 113, and drive line through holes 114; the central threaded hole 31 is arranged at a top center position of the front-end unit 3, and the threaded hole may be connected with the operating apparatus, such as a camera, a sander, a scalpel, and other devices; and the rest structures are the same as the spherical shell structure 11.

Figure 6:
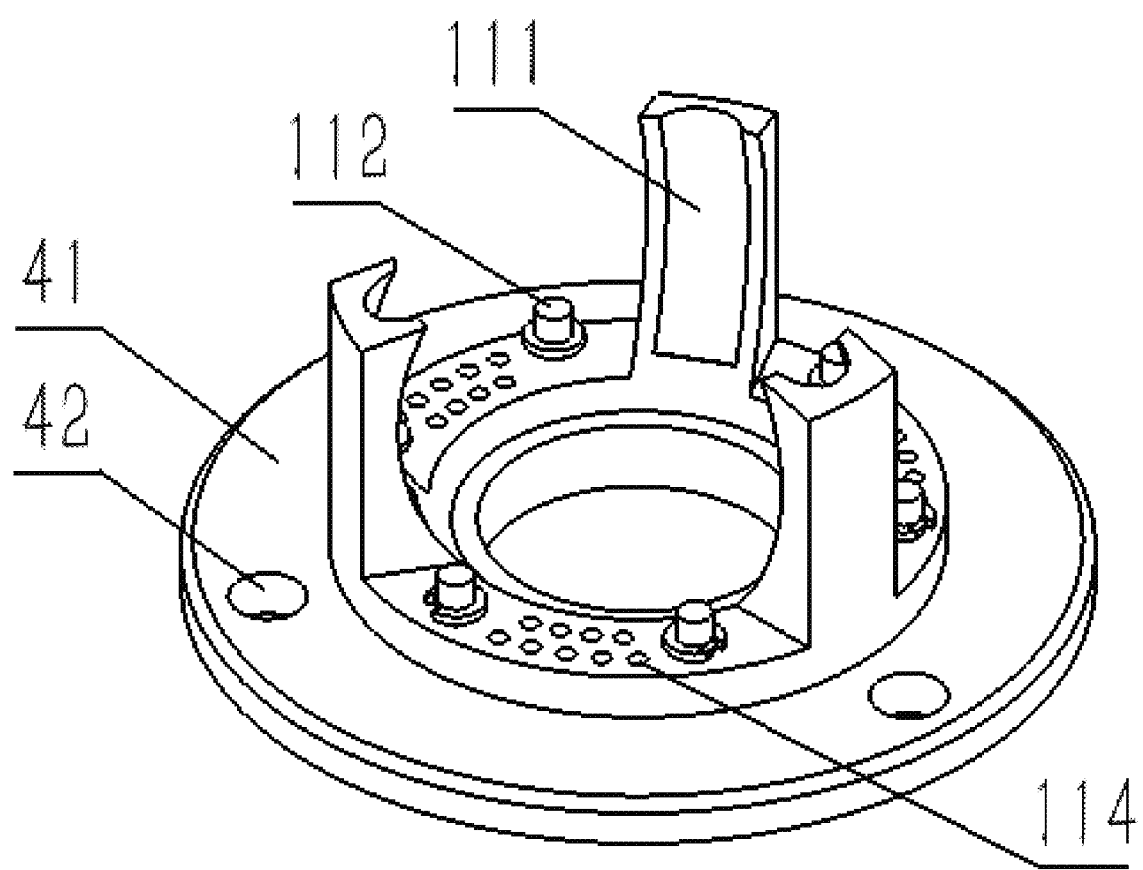
FIG. 6 is a schematic structural diagram of a rear-end unit in the present disclosure.

As shown in FIG. 6, the rear-end unit 4 includes a connecting chassis 41, mounting fixing holes 42, outer raceways 111, spring limiting columns 112, and drive line through holes 114; the connecting chassis 41 is connected to a rear-end driving system through the mounting fixing holes 42; and the rest structures are the same as the spherical shell structure 11.

Figure 7:
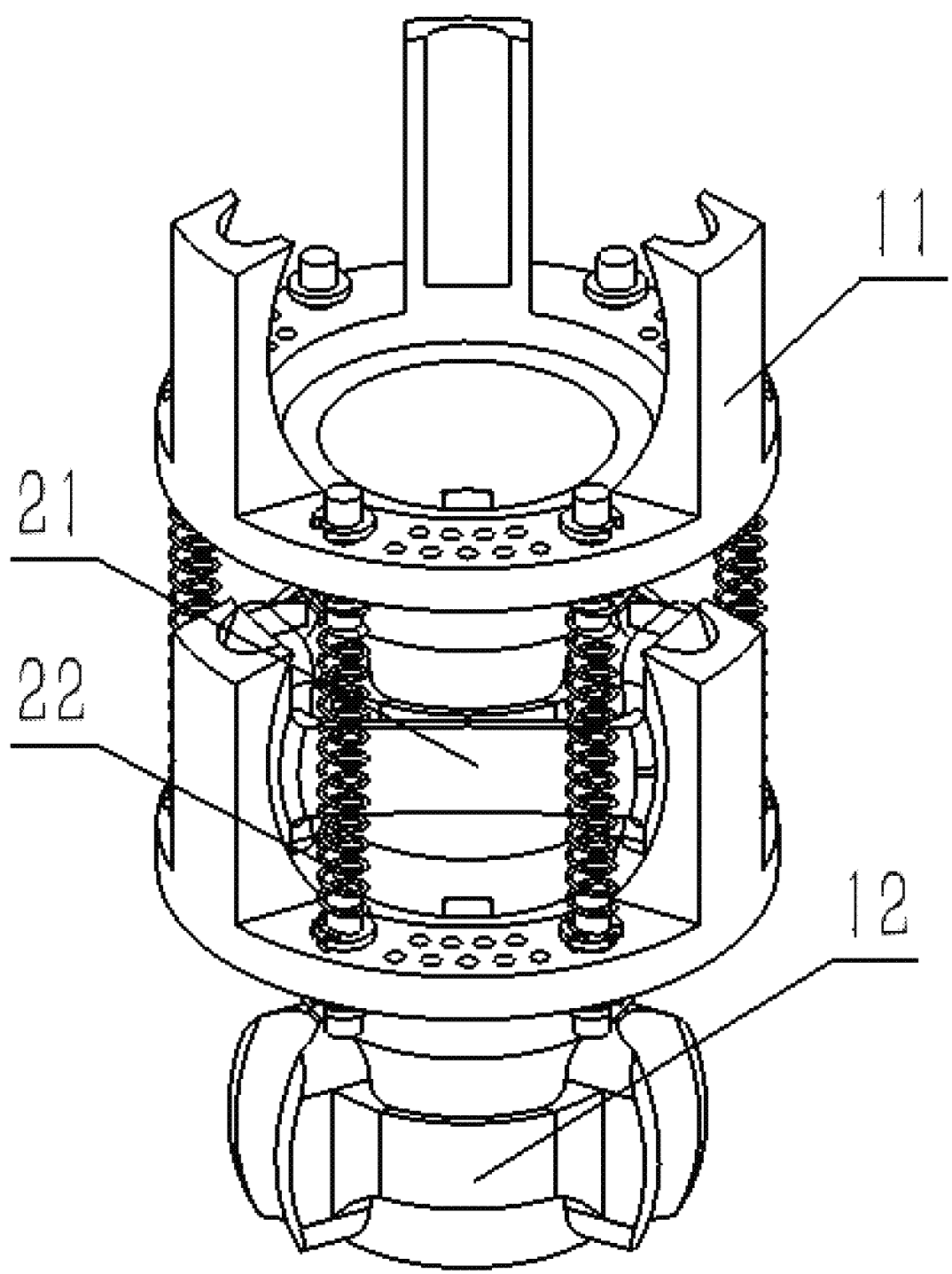
FIG. 7 is a schematic structural diagram of a joint connecting structure in the present disclosure.

As shown in FIG. 7, each joint connecting structure 2 includes a triangular retainer 21, a flexible spring 22 and roll balls 23; the triangular retainer 21 is arranged between the spherical shell structure 11 and the inner race structure 12, and the three are nested with one other and are in clearance fit; two ends of the flexible springs 22 are connected to the two adjacent spherical shell structures 11; and the roll balls 23 are nested in three holes of the triangular retainer 21, and then respectively mounted in a raceway formed between the spherical shell structure 11 and the inner race structure 12.

Figure 8:
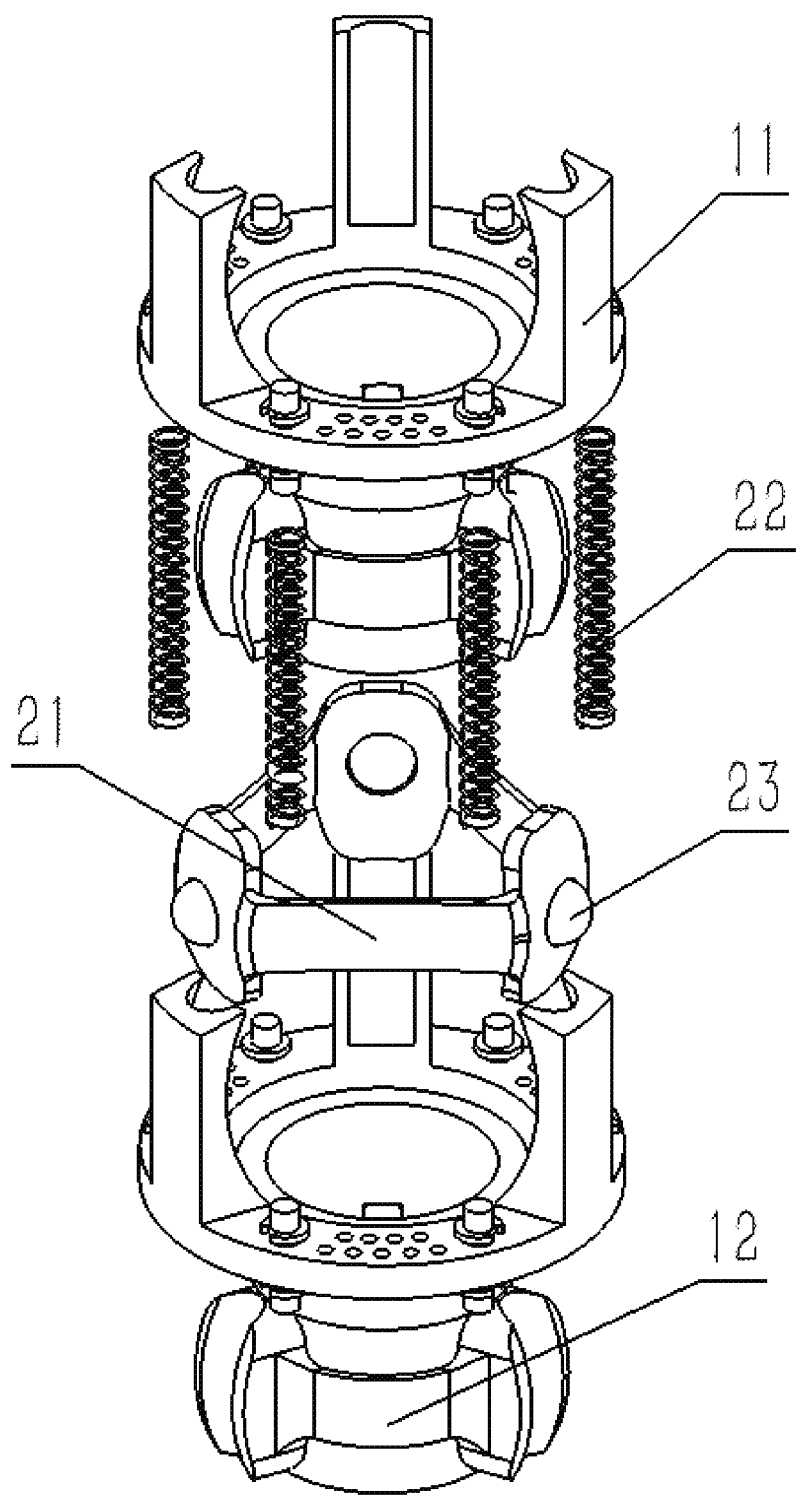
FIG. 8 is a schematic explosion diagram of a joint connecting structure in the present disclosure.

As shown in FIG. 8, side walls in three directions of the triangular retainers 21 are spherical surfaces, and three through holes are formed in the side walls for limiting motion of the roll balls 23; the flexible springs 22 are connected to the spring limiting columns 112 and connect the two adjacent main structural units 1; the roll balls 23 are placed in raceways formed by the outer raceways 111 and the inner raceways 121; and every two adjacent main structural units 1 are connected through the joint connecting structures 2 and constitute joints, in the joints, the spherical shell structures 11 are located outside, the inner race structures 12 are located inside, the triangular retainers 21 are between the spherical shell structures 11 and the inner race structures 12, the spherical surfaces thereof are in contact and nested with each other for clearance fit, so as to form a spherical pair connection.

Figure 9:
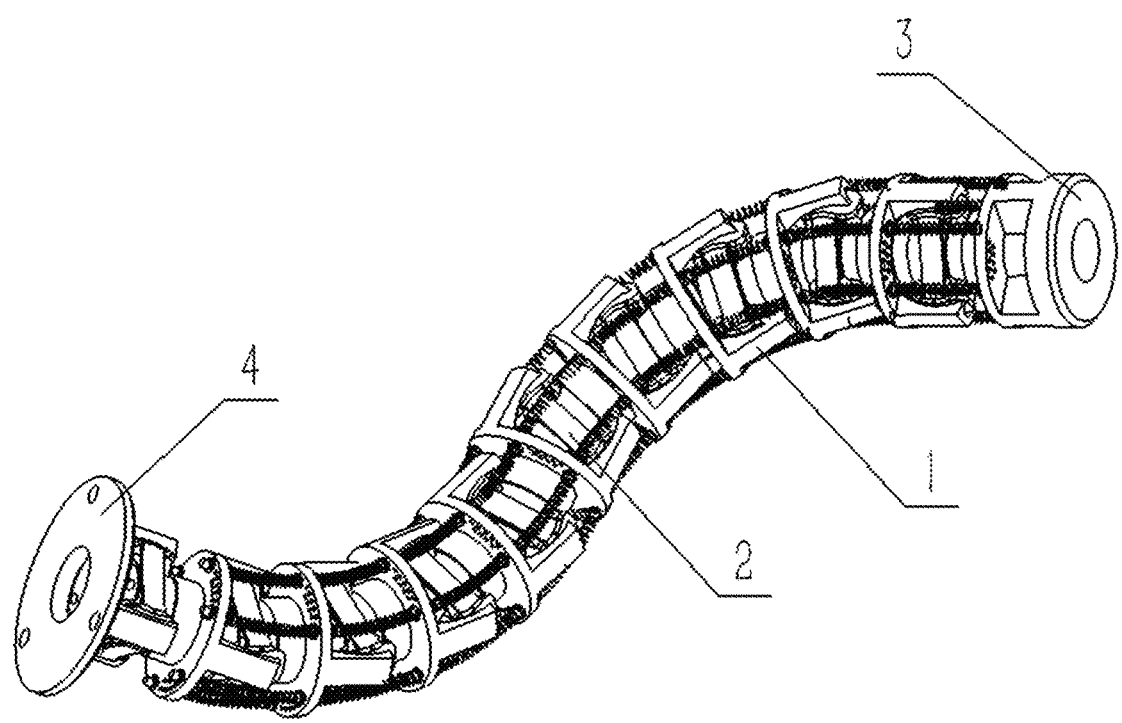
FIG. 9 is a schematic structural diagram of a continuum manipulator after deformation of the present disclosure.

As shown in FIG. 9, when the birfield flexible variable-stiffness continuum robot unit and the robot work, the drive lines apply forces to make the main structural units 1 rotate under pressure, and the joint connecting structures 2 are deformed, such that the entire manipulator reaches a required deformation state.

In an embodiment, the birfield flexible variable-stiffness continuum robot unit includes main structural units 1, joint connecting structures 2, a front-end unit 3 and a rear-end unit 4; and the plurality of main structural units 1 are interconnected, the front-end unit 3 is arranged at a foremost end, the rear-end unit is arranged at a rearmost end, an operating apparatus is arranged at a central threaded hole 31 of the front-end unit 3, and a plurality of drive lines sequentially penetrate through drive line through holes 114, so as to constitute the birfield flexible variable-stiffness continuum robot unit and a robot. When a manipulator works, the rear-end unit 4 is connected to a driving system, the driving system pulls the drive lines to drive the units to rotate under pressure, in the joint connecting structures 2, a spherical shell structure 11 is located outside, an inner race structure 12 is located inside, a triangular retainer 21 is between the spherical shell structure 11 and the inner race structure 12, spherical surfaces thereof are in contact and nested with each other for clearance fit, so as to form a spherical pair connection, joints rotate around a center of a sphere to achieve a required deformation state, and each joint has two degrees of freedom, such that the single joint may rotate in each direction, is relatively flexible and variable, and is high in adaptability.

Springs are arranged on both sides of an outer raceway of each joint, when the joints are not curved, the springs are already in a stretching state, when the joints are curved, the stretching amount of the springs in a curving direction is reduced, the tensile force is reduced, otherwise, the tensile force is increased, such that certain stiffness is provided for the entire manipulator, and some negative effects of an action of gravity are counteracted. More importantly, the manipulator can have a variable-stiffness characteristic, as curved angles of the joints are different, the joint stiffness is also different, the problem that an angle difference of each joint in the same segment is large due to underactuation is avoided, and the control precision is improved.

When the two adjacent structural units are about to twist, since three roll balls are placed in the inner and outer raceways, the roll balls and the inner and outer raceways generate a contact twisting force to limit torsion skewing of the inner and outer raceways, such that the torsional resistance of the entire structure is greatly improved, and a larger torsional load may be borne.

Through holes are formed in the middle of the entire structure to arrange operating apparatuses, such as a cable, a camera, a searchlight, a sander and a scalpel, so as to better adapt different environments for operation.

In an embodiment, the birfield flexible variable-stiffness continuum robot unit includes:
  main structural units 1, interconnected to constitute a continuum manipulator;
  joint connecting structures 2, connecting the two adjacent main structural units 1;
  a front-end unit 3, arranged at a foremost end of the manipulator; and
  a rear-end unit 4, arranged at a rearmost end of the manipulator.

Further, each main structural unit 1 includes a spherical shell structure 11 and an inner race structure 12; and a connection mode of the spherical shell structure 11 and the inner race structure 12 is a key connection. Each joint connecting structure 2 includes a triangular retainer 21, a flexible spring 22, and roll balls 23; the triangular retainer 21 is arranged between the spherical shell structure 11 and the inner race structure 12, and the three are nested one another for clearance fit; two ends of the flexible spring 22 are connected to the two adjacent spherical shell structures 11; and the roll balls 23 are nested in three holes of the triangular retainer 21, and then respectively mounted in a raceway formed between the spherical shell structure 11 and the inner race structure 12. The front-end unit 3 includes a central threaded hole 31, spring limiting columns 112, connecting keyways 113, and drive line through holes 114; and the central threaded hole 31 is arranged at a top center position of the front-end unit 3, and the threaded hole may be connected with operating apparatuses, such as a camera, a sander, a scalpel, and other devices. The rear-end unit 4 includes a connecting chassis 41, mounting fixing holes 42, outer raceways 111, spring limiting columns 112, and drive line through holes 114; and the connecting chassis 41 is connected to a rear-end driving system through the mounting fixing holes 42. Each spherical shell structure 11 includes outer raceways 111, spring limiting columns 112, a connecting keyway 113, and drive line through holes 114; the outer raceways 111 are spherical raceways, arranged at an outermost ring of the spherical shell structure 11, and match with the inner raceways 121 to accommodate the roll balls 23; the spring limiting columns 112 are arranged next to the outer raceways 111 for fixing the flexible springs 22; the connecting keyway 113 is arranged on a side wall of the center through hole for being connected with the inner race structure 12; and the drive line through holes 114 are formed between the spring limiting columns 112 for being penetrated by drive lines. Each inner race structure 12 includes inner raceways 121 and a connecting key 122; the inner raceways 121 are arranged on a side wall of the inner race structure 12, and match with the outer raceways 111 to accommodate the roll balls 23; and the connecting key 122 is arranged on an inner wall of the center through hole for being connected with the spherical shell structure 11. Side walls in three directions of the triangle retainer 21 are spherical surfaces, and three through holes are formed in the side walls for limiting motion of the roll balls 23; the flexible springs 22 are connected to the spring limiting columns 112 and connect the two adjacent main structural units 1; and the roll balls 23 are placed in a raceway formed by the outer raceways 111 and the inner raceways 121. Every two adjacent main structural units 1 are connected through the joint connecting structure 2 and constitute a joint, in the joint, the spherical shell structure 11 is located outside, the inner race structure 12 is located inside, the triangular retainer 21 is between the spherical shell structure 11 and the inner race structure 12, the spherical surfaces thereof are in contact and nested with one another for clearance fit, so as to form a spherical pair connection. The plurality of main structural units 1 are interconnected, the front-end unit 3 is arranged at the foremost end, the rear-end unit 4 is arranged at the rearmost end, the operating apparatuses are arranged at the central threaded holes 31 of the front-end unit 3, and the plurality of drive lines sequentially penetrate through the drive line through holes 114 to constitute the birfield flexible variable-stiffness continuum robot.

Basic principles of the present application are described above in conjunction with specific embodiments, however, it needs to be noted that merits, advantages, effects, etc. mentioned in the present application are merely illustrative but not limitation, and it should not be considered that these merits, advantages, effects, etc. are necessary for the embodiments of the present application. In addition, the above disclosed specific details are merely for the action of illustration and the action of understanding, not limitation, and the above details do not limit the present application to need to adopt the above specific details for implementation.

The above description has been already given for objectives of illustration and description. In addition, the description is not intended to limit the embodiments of the present application to the form disclosed herein. Although the plurality of embodiments have been already discussed above, those skilled in the art will know various forms such as some deformations, modifications, additions and sub-combinations, as revealed in the specification and without departing from the scope of protection of the claims of the present disclosure, all of which fall within the protection of the present disclosure.

The invention claimed is:

1. A birfield flexible variable-stiffness continuum robot unit, comprising:
   a plurality of main structural units, interconnected in series to a manipulator, and each comprising:
   a spherical shell structure, comprising:
   an annular bearing surface, having a center through hole,
   three outer raceways, equidistantly distributed on an outermost ring of the annular bearing surface and extending upwards from the annular bearing surface, spherical raceways of the three outer raceways all facing towards a central axis of the annular bearing surface,
   a plurality of spring limiting columns, distributed on the annular bearing surface between the adjacent outer raceways in a penetrating mode,
   a plurality of drive line through holes, distributed on the annular bearing surface between the adjacent spring limiting columns in a penetrating mode, and
   a connecting barrel, extending downwards from the center through hole of the annular bearing surface, a connecting keyway being arranged on a side wall of the connecting barrel and extending in a direction parallel to the central axis; and
   an inner race structure, comprising:
   three inner raceways, equidistantly distributed on an outer side wall of the inner race structure, the inner raceways matching with the outer raceways of the adjacent main structural units to accommodate roll balls together, and
      a connecting key, arranged on an inner side wall of the inner race structure and aligning at an inner wall of the center through hole, the connecting key being in key joint with the connecting keyway to connect the inner race structure with the spherical shell structure;
   a plurality of joint connecting structures, connecting the two adjacent main structural units, and each comprising:
   a triangular retainer, arranged between the spherical shell structure of one main structural unit and the inner race structure of the previous main structural unit,
   three roll balls, nested in holes in three angles of the triangular retainer respectively, the roll balls being assembled in a raceway formed by the outer raceway of the spherical shell structure of one main structural unit and the inner raceway of the inner race structure of the previous main structural unit, and
   a plurality of flexible springs, with two ends being connected to the spring limiting column of the two adjacent spherical shell structures;
   a front-end unit, arranged at a foremost end of the manipulator, and comprising:
   a unit body, comprising a central threaded hole penetrating along the central axis,
   a plurality of side channels, recessed inwards from a side surface of the unit body in a direction perpendicular to the central axis,
   a plurality of drive line through holes, formed in bottom surfaces of the side channels,
   a plurality of spring limiting columns, distributed at a bottom of the unit body, and
   a connecting barrel, extending downwards from the central threaded hole of the front-end unit, a connecting keyway being arranged on a side wall of the connecting barrel and extending in a direction parallel to the central axis, and the connecting keyway being in key joint with the connecting keys of the adjacent main structural units; and
   a rear-end unit, arranged at a rearmost end of the manipulator, and comprising:
   an annular bearing surface, having a center through hole,
   three outer raceways, equidistantly distributed on an outermost ring of the annular bearing surface and extending upwards from the annular bearing surface, spherical raceways of the three outer raceways all facing towards a central axis of the annular bearing surface,
   a plurality of spring limiting columns, distributed on the annular bearing surface between the adjacent outer raceways,
   a plurality of drive line through holes, distributed on the annular bearing surface between the adjacent spring limiting columns in a penetrating mode, and
   a connecting chassis, arranged at a bottom of the annular bearing surface of the rear-end unit, a plurality of mounting fixing holes being distributed on a periphery of the connecting chassis.

2. The birfield flexible variable-stiffness continuum robot unit according to claim 1, wherein, the unit body is of a hollow cylinder structure.

3. The birfield flexible variable-stiffness continuum robot unit according to claim 1, wherein, the front-end unit is in threaded connection with operating apparatuses via the central threaded hole.

4. The birfield flexible variable-stiffness continuum robot unit according to claim 3, wherein, the operating apparatuses comprise a camera, a searchlight, a sander or a scalpel, etc.

5. The birfield flexible variable-stiffness continuum robot unit according to claim 1, wherein, the rear-end unit is fixedly connected to a driving system via the mounting fixing holes.

6. The birfield flexible variable-stiffness continuum robot unit according to claim 1, wherein, outer surfaces of angles in three directions of the triangular retainer are spherical surfaces.

7. The birfield flexible variable-stiffness continuum robot unit according to claim 1, wherein, a pore diameter of the center through hole is the same as a pore diameter of the central threaded hole.

8. A continuum robot, comprising the birfield flexible variable-stiffness continuum robot unit according to claim 1, wherein, a plurality of drive lines sequentially penetrate through a front-end unit and a main structural units to be connected with drive line through holes of a rear-end unit to form the continuum robot.

9. The continuum robot of claim 8, wherein the unit body is of a hollow cylinder structure.

10. The continuum robot of claim 8, wherein the front-end unit is in threaded connection with operating apparatuses via the central threaded hole.

11. The continuum robot of claim 10, wherein the operating apparatuses comprise a camera, a searchlight, a sander or a scalpel, etc.

12. The continuum robot of claim 8, wherein the rear-end unit is fixedly connected to a driving system via the mounting fixing holes.

13. The continuum robot of claim 8, wherein outer surfaces of angles in three directions of the triangular retainer are spherical surfaces.

14. The continuum robot of claim 8, wherein a pore diameter of the center through hole is the same as a pore diameter of the central threaded hole.

* * * * *